United States Patent
Gao et al.

(10) Patent No.: US 12,394,890 B2
(45) Date of Patent: Aug. 19, 2025

(54) TERMINAL DEVICE WITH NOISE SUPPRESSION STRUCTURE

(71) Applicant: Honor Device Co., Ltd., Shenzhen (CN)

(72) Inventors: Qi Gao, Shenzhen (CN); Longfei Shi, Shenzhen (CN); Jiaqi Chen, Shenzhen (CN); Jing Yang, Shenzhen (CN); Keyu Si, Shenzhen (CN); Ming Yin, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 153 days.

(21) Appl. No.: 18/010,137

(22) PCT Filed: May 12, 2022

(86) PCT No.: PCT/CN2022/092368
§ 371 (c)(1),
(2) Date: Dec. 13, 2022

(87) PCT Pub. No.: WO2022/242532
PCT Pub. Date: Nov. 24, 2022

(65) Prior Publication Data
US 2023/0238694 A1    Jul. 27, 2023

(30) Foreign Application Priority Data
May 19, 2021   (CN) .......................... 202110547199.X

(51) Int. Cl.
*H01Q 1/52*    (2006.01)
*H01Q 1/24*    (2006.01)

(52) U.S. Cl.
CPC ............... *H01Q 1/52* (2013.01); *H01Q 1/243* (2013.01); *H01Q 1/526* (2013.01)

(58) Field of Classification Search
CPC .......... H01Q 1/52; H01Q 1/243; H04M 1/026
See application file for complete search history.

(56) References Cited

U.S. PATENT DOCUMENTS

| 10,601,129 B2 | 3/2020 | Yang et al. |
| 10,855,248 B2 | 12/2020 | Oda |

(Continued)

FOREIGN PATENT DOCUMENTS

| CN | 106935959 A | 7/2017 |
| CN | 108336478 A | 7/2018 |

(Continued)

OTHER PUBLICATIONS

Shen, Caili et al., "Noise Suppression in CCD Camera Imaging Circuits Using Electromagnetic Band-gap Structure," Spacecraft Recovery & Remote Sensing, vol. 36, No. 5, pp. 44-50 (Oct. 2015).

*Primary Examiner* — Alexander H Taningco
*Assistant Examiner* — Austin M Back
(74) *Attorney, Agent, or Firm* — Leydig, Voit & Mayer, Ltd.

(57) ABSTRACT

This application provides a terminal device, including a noise suppression structure, where the noise suppression structure is disposed on the metal middle plate, the noise suppression structure includes a hollow region running through the first surface and the second surface, and the hollow region communicates with the first cavity, so that digital signal noise that uses the first cavity as a transmission medium has a propagation path in a direction toward the antenna, the propagation path passes through the hollow region, and the hollow region is used to suppress the digital signal noise transmitted through the propagation path, so as to prevent antenna operating performance from being affected by the digital signal noise.

19 Claims, 13 Drawing Sheets

(56) References Cited

U.S. PATENT DOCUMENTS

| | | | |
|---|---|---|---|
| 2005/0156784 A1 | 7/2005 | Ryken, Jr. et al. | |
| 2006/0290564 A1 | 12/2006 | Sasada et al. | |
| 2009/0073059 A1 | 3/2009 | Ikegaya | |
| 2011/0291896 A1* | 12/2011 | Pascolini | H01Q 7/00 |
| | | | 343/702 |
| 2017/0250460 A1 | 8/2017 | Shin et al. | |
| 2018/0115069 A1 | 4/2018 | Mai et al. | |
| 2019/0074586 A1* | 3/2019 | Ruaro | H01Q 9/04 |
| 2021/0096804 A1* | 4/2021 | Mahmoud | G09G 3/20 |

FOREIGN PATENT DOCUMENTS

| | | |
|---|---|---|
| CN | 109860981 A | 6/2019 |
| CN | 110350294 A | 10/2019 |
| CN | 111129741 A | 5/2020 |
| CN | 111342200 A | 6/2020 |
| CN | 211556116 U | 9/2020 |
| CN | 112421210 A | 2/2021 |
| CN | 112736439 A | 4/2021 |
| CN | 113410643 A | 9/2021 |
| IN | 105591190 A | 5/2016 |
| JP | 200629834 A | 2/2006 |
| JP | 200938507 A | 2/2009 |
| JP | 201893057 A | 6/2018 |
| KR | 1020150012932 A | 2/2015 |

\* cited by examiner

TERMINAL DEVICE WITH NOISE SUPPRESSION STRUCTURE

CROSS-REFERENCE TO RELATED APPLICATIONS

This application is a national stage of International Application No. PCT/CN2022/092368, filed on May 12, 2022, which claims priority to Chinese Patent Application No. 202110547199.X, filed on May 19, 2021. The disclosures of both of the aforementioned applications are hereby incorporated by reference in their entireties.

TECHNICAL FIELD

This application relates to the field of related technologies of mobile terminals, and in particular, to a terminal device with a noise suppression structure.

BACKGROUND

When a mobile terminal device operates, internal circuit boards, multimedia devices, and electronic elements such as connectors all generate related digital signal noise. Generally, a slit space exists between elements such as a circuit board, a battery, and a metal back frame of a display screen, and a middle frame of the mobile phone, and harmonics of the digital signal noise may be transmitted to an antenna at an edge of the middle frame by using the slit space as a transmission path, thereby causing poor operating performance of the antenna. When harmonics of digital signal noise of any frequency are greater than a cut-off frequency, lossless transmission can be implemented in the slit.

How to design to suppress lossless digital signal noise transmission inside a mobile phone is a research and development direction in the industry.

SUMMARY

This application provides a terminal device with a noise suppression structure, to suppress digital signal noise transmission within a slit by changing a transmission characteristic of the slit, so as to resolve a technical problem of lossless digital signal noise transmission inside a mobile phone.

An embodiment provides a terminal device with a noise suppression structure, including an antenna, a middle frame, and a first component, where the middle frame includes a metal middle plate and a metal bezel, the antenna is disposed on the metal bezel, the metal middle plate includes a first surface and a second surface opposite to the first surface, the first component is mounted on the middle frame, and a first cavity is formed between the first component and the first surface.

The terminal includes a noise suppression structure, the noise suppression structure is disposed on the metal middle plate, the noise suppression structure includes a hollow region running through the first surface and the second surface, and the hollow region communicates with the first cavity; and digital signal noise that uses the first cavity as a transmission medium has a propagation path in a direction toward the antenna, the propagation path passes through the hollow region, and the hollow region is used to suppress the digital signal noise transmitted by using the propagation path.

In the terminal described in this embodiment, a hollow region is disposed on a metal middle plate of a middle frame, so as to change a transmission characteristic of a cavity that is formed in the metal middle plate, and the hollow region is located on a transmission path connected to an antenna of the terminal, so that electric field distribution and magnetic field distribution of digital signal noise are changed when the digital signal noise is transmitted on the transmission path in the cavity. The hollow region can suppress a part of the digital signal noise, so that digital signal noise transmission at a specific frequency on the transmission path is suppressed, where the specific frequency is an operating frequency of the antenna.

In an embodiment, an area of the hollow region has a corresponding change trend relationship with a frequency and a bandwidth of the digital signal noise passing through the hollow region. Different types of hollow regions are provided according to frequency and bandwidth characteristics of the digital signal noise. An increase in the area and density of the hollow region may suppress digital signal noise with a larger resonance frequency, and further may specially suppress digital signal noise with different resonance frequencies.

In an embodiment, the hollow region includes a through-slot running through the first surface and the second surface, the through-slot includes a strip-shaped first segment and two strip-shaped second segments, the first segment extends along a width direction of the metal middle plate, and the two second segments are respectively bent and extend from two opposite ends of the first segment toward a length direction of the metal middle plate.

In an embodiment, there are two through-slots, first segments of the two through-slots are spaced in parallel, and extension directions of second segments of the two through-slots are opposite.

In an embodiment, the hollow region includes two through-slot groups, each of the through-slot groups includes a first through-slot and a second through-slot, and the first through-slot and the second through-slot are spaced; and the first through-slot includes a strip-shaped first segment and two strip-shaped second segments, the first segment extends along a width direction of the metal middle plate, and the two second segments are respectively bent and extend from two opposite ends of the first segment toward a length direction of the metal middle plate.

The second through-slot has a same structure as but a different size from the first through-slot, the second through-slot includes a first segment and two second segments, the second through-slot is located between the two second segments of the first through-slot and has a same symmetry axis as the first through-slot, and the second segment of the first through-slot has a same extension direction as the second segment of the second through-slot; and in the two through-slot groups, a first through-slot of one through-slot group is spaced from a first through-slot of the other through-slot group, and an extension direction of a second segment of one first through-slot is opposite to that of a second segment of the other first through-slot.

In an embodiment, the noise suppression structure includes a plurality of holes running through the middle plate, and the plurality of holes are spaced regularly to form the hollow region.

In an embodiment, an axial cross-sectional contour of each of the holes is a regular polygon or a circular shape. By setting holes of different shapes to form a hollow region, a structure is simple and easy to implement, and is more suitable for suppressing digital signal noise with a small resonance frequency range of a corresponding noise frequency.

In an embodiment, the noise suppression structure includes a plurality of slits running through the middle plate, each of the slits extends in a curved way, and the plurality of slits are regularly arranged to form the hollow region. In an embodiment, the plurality of slits have consistent extension directions and are spaced, or the plurality of slits have consistent extension directions and are arranged side by side, and every two adjacent slits communicate with each other head to tail. By setting a hollow region of a complex structure, not only cavity transmission suppression for digital signal noise at a fixed frequency can be implemented, but also cavity transmission suppression for ultra-wideband digital signal noise can be implemented. The foregoing two embodiments may provide design and suppression for frequencies of noise from different signal noise sources, thereby simplifying a processing process of the terminal device.

In an embodiment, the hollow region is a strip-shaped through-slot running through the metal middle plate. The hollow region in this structure has a simple structure and is easy to process, and is suitable for suppressing low-frequency signal noise.

In an embodiment, the terminal device with a noise suppression structure includes a second component mounted on the middle frame, the second component is opposite to the first or second surface and forms a second cavity with the first or second surface, the second cavity is spaced from the first cavity, and the hollow region communicates with the second cavity. The hollow region of the noise suppression structure can also suppress digital signal noise in another cavity on the other side of the middle frame. An additional noise suppression structure is not required, and a terminal structure is simplified and processing difficulty is reduced.

In an embodiment, the terminal device includes a third component mounted on the middle frame, the third component is opposite to the first or second surface and forms a third cavity with the first or second surface, the third cavity is spaced from the first cavity and the second cavity, and the hollow region of the noise suppression structure communicates with the third cavity. The hollow region of the noise suppression structure can also suppress digital signal noise in another cavity on the other side of the middle frame. An additional noise suppression structure is required, and a terminal device structure is simplified and processing difficulty is reduced.

In an embodiment, the terminal device includes a second component and a third component mounted on the middle frame, the second component and the third component are both opposite to the second surface, the second component and the third component form a second cavity and a third cavity with the second surface respectively, the second cavity and the third cavity are spaced side by side, and a first noise suppression structure and a second noise suppression structure that have a same structure as the noise suppression structure are disposed at locations on the metal middle plate and opposite to the second cavity and the third cavity respectively, and the noise suppression structure is located between the first noise suppression structure and the second noise suppression structure. In an embodiment, the first component is a display screen, the third component is a battery, and the second component is a circuit board; or the third component is a circuit board, and the second component is a circuit board. In this embodiment, the first component is a display screen, the third component is a battery, and the second component is a circuit board. The antenna of the terminal is located at the top or a side part. For example, when the antenna of the terminal is located at the top, a signal is transmitted from the bottom of the terminal when the display screen operates. Signal noise is propagated in a plurality of paths in the first cavity, and a noise suppression structure is disposed on a propagation path toward the antenna. A hollow region of the noise suppression structure suppresses digital signal noise generated during operation of the display screen, and is specially for noise that affects an operating frequency corresponding to the antenna. In this way, impact of a noise signal on operating performance of the antenna in the frequency band can be reduced or prevented.

In an embodiment, the first component is a display screen, the display screen includes a metal backplane opposite to the first surface, and the metal backplane is further provided with the noise suppression structure. In this embodiment, on the basis of the foregoing embodiment, a noise suppression structure is also disposed on the back of the display screen, so that digital signal noise in a larger frequency band can be suppressed.

In an embodiment, the noise suppression structure is located on the metal middle plate at a location corresponding to a middle region of the transmission path. In this embodiment, an existing common antenna is disposed at the top of the terminal, a signal source is located at the bottom, and digital signal noise in the middle region has greatest impact on corresponding operating performance of the antenna. Therefore, a noise suppression structure may be disposed in the middle region to suppress the digital signal noise, so as to ensure antenna performance.

In an embodiment, the first component is a display screen, the display screen includes a metal backplane opposite to the first surface, and the metal backplane is further provided with the noise suppression structure; and the hollow region includes a through-slot running through the first surface and the second surface, the through-slot includes a strip-shaped first segment and two strip-shaped second segments, the first segment extends along a width direction of the metal middle plate, and the two second segments are respectively bent and extend from two opposite ends of the first segment toward a length direction of the metal middle plate.

In an embodiment, the first component is a display screen, the display screen includes a metal backplane opposite to the first surface, and the metal backplane is further provided with the noise suppression structure; and the hollow region of the noise suppression structure on the metal backplane is formed by several slits, the slits extend in a serpentine shape, every two adjacent slits are symmetrically disposed, and a total length direction of the slits is consistent with a width direction of the metal middle plate. In this embodiment, a resonance frequency of the noise suppression structure in the first cavity presents an ultra-wideband characteristic. By providing the metal backplane of the first cavity with a slit structure having a complex form and a large density, not only cavity transmission suppression for fixed-frequency noise can be implemented, but also cavity transmission suppression for ultra-wideband noise can be implemented.

The hollow region of the noise suppression structure on the metal backplane is formed by a plurality of holes that have a cross-sectional area of "cross", and the plurality of holes are arranged in a matrix at a middle location of the metal middle plate. In this embodiment, a feature mode transmission characteristic of an original cavity is changed by using a noise suppression structure formed by holes in a "cross" shape. The noise suppression structure formed by the holes in a "cross" shape may generate, in the cavity, a resonance point of a fixed frequency corresponding to a digital signal noise frequency that affects operation of an existing display screen, and may improve suppression on noise transmission at this frequency. In addition, by adjusting an individual quantity of "cross" shaped array aperture structures and an array arrangement manner, a resonance frequency of a corresponding noise frequency can be generated in the cavity, and transmission of specific-frequency noise can be suppressed.

In an embodiment, the terminal includes a top end and a bottom end, the antenna is at a top end location, the noise suppression structure is at a middle location of the metal backplane, and an overall length of the hollow structure extends along a length direction of the metal backplane. A hollow structure is disposed at a middle location for digital signal noise frequency affecting operation of an existing display screen, so that noise transmission can be more effectively suppressed.

A terminal device with a noise suppression structure includes an antenna, a middle frame, and a display screen, where the display screen includes a metal backplane, the antenna is disposed at an edge of the middle frame, the middle frame includes a first surface and a second surface opposite to the first surface, the display screen is mounted on the middle frame, and a cavity is formed between the metal backplane and the first surface. The terminal includes a noise suppression structure, the noise suppression structure is disposed on the metal backplane, the noise suppression structure includes a hollow region running through the metal backplane, and the hollow region communicates with the cavity, so that digital signal noise that uses the cavity as a transmission medium has a propagation path in a direction toward the antenna, the propagation path passes through the hollow region, and the hollow region is used to suppress the digital signal noise transmitted by using the propagation path. In the terminal device in this embodiment, a noise suppression structure is disposed on a metal backplane of a display screen, so as to change a transmission characteristic of a cavity that is formed in the metal backplane, and the hollow region is located on a transmission path connected to an antenna of the terminal, so that electric field distribution and magnetic field distribution of digital signal noise are changed when the digital signal noise is transmitted on the transmission path in the cavity. The hollow region can suppress a part of the digital signal noise, so that digital signal noise transmission at a specific frequency on the transmission path is suppressed, where the specific frequency is an operating frequency of the antenna.

In an embodiment, the hollow region includes a through-slot running through the first surface and the second surface, the through-slot includes a strip-shaped first segment and two strip-shaped second segments, the first segment extends along a width direction of the metal middle plate, and the two second segments are respectively bent and extend from two opposite ends of the first segment toward a length direction of the metal middle plate.

In an embodiment, there are two through-slots, first segments of the two through-slots are spaced in parallel, and extension directions of second segments of the two through-slots are opposite.

In an embodiment, the hollow region includes two through-slot groups, each of the through-slot groups includes a first through-slot and a second through-slot, and the first through-slot and the second through-slot are spaced; the first through-slot includes a strip-shaped first segment and two strip-shaped second segments, the first segment extends along a width direction of the metal middle plate, and the two second segments are respectively bent and extend from two opposite ends of the first segment toward a length direction of the metal middle plate; the second through-slot has a same structure as but a different size from the first through-slot, the second through-slot includes a first segment and two second segments, the second through-slot is located between the two second segments of the first through-slot and has a same symmetry axis as the first through-slot, and the second segment of the first through-slot has a same extension direction as the second segment of the second through-slot; and in the two through-slot groups, a first through-slot of one through-slot group is spaced from a first through-slot of the other through-slot group, and an extension direction of a second segment of one first through-slot is opposite to that of a second segment of the other first through-slot.

According to the terminal device with a noise suppression structure described in this application, a noise suppression structure is disposed on a middle frame, which is corresponding to a cavity formed by the middle frame and a first component, so as to suppress digital signal noise generated when the terminal operates, so as to reduce impact of digital signal noise on antenna operating performance, so as to resolve a technical problem of lossless digital signal noise transmission inside a mobile phone. Compared with a conventional solution that a spring plate, a conductive foam, or a wave absorbing material needs to be added for suppressing noise transmission within a cavity, in the technical solution of this application, costs of an electrical connection auxiliary material can be reduced, the technical solution is not limited by a spatial structure of the cavity, and implementation is flexible.

BRIEF DESCRIPTION OF DRAWINGS

To describe the technical solutions in the embodiments of this application or the background more clearly, the following describes the accompanying drawings required in the embodiments of this application or the background.

DESCRIPTION OF EMBODIMENTS

The following describes the embodiments of this application with reference to the accompanying drawings in the embodiments of this application.

Figure 1:
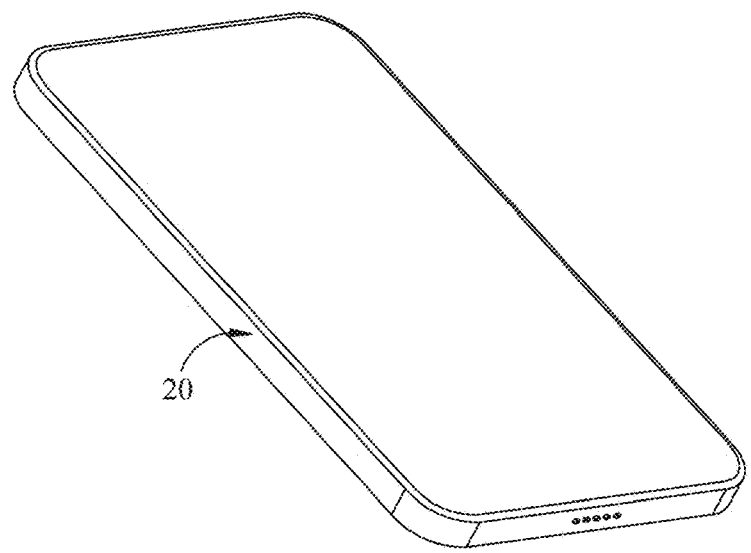
FIG. 1 is a schematic structural diagram of a terminal device with a noise suppression structure according to an embodiment of this application.
Figure 2:
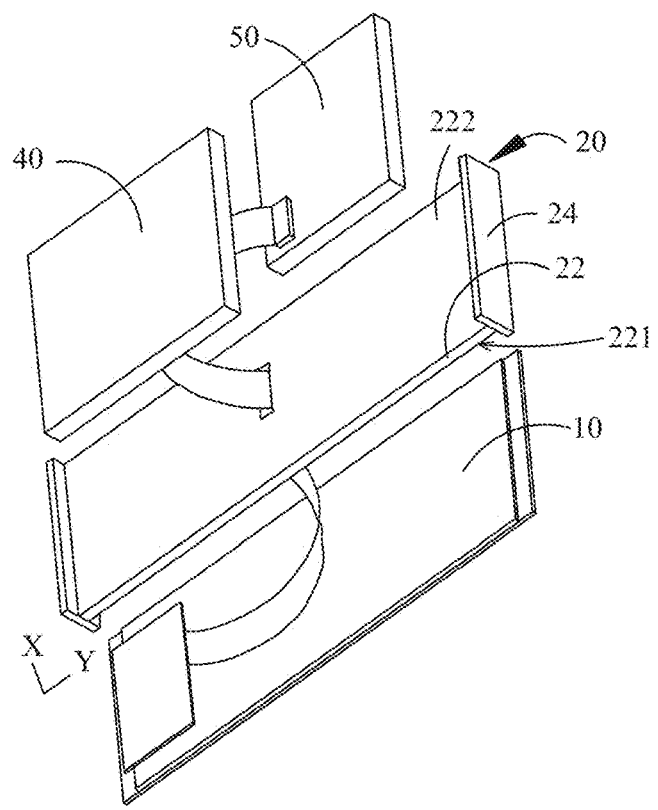
FIG. 2 is a schematic diagram of partial structural decomposition of the terminal device with a noise suppression structure shown in FIG. 1.
Figure 3:
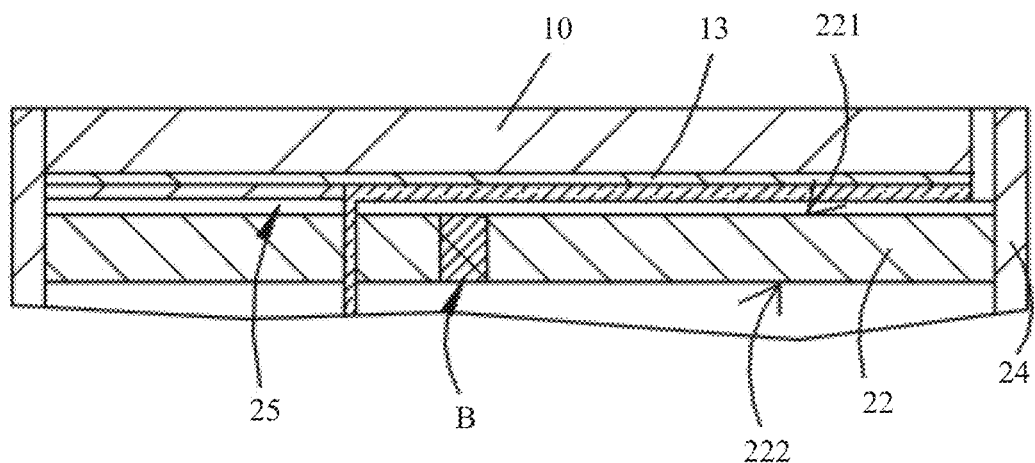
FIG. 3 is a schematic diagram of an internal side of a partial structure of the terminal device with a noise suppression structure shown in FIG. 1 in a length direction.

Referring to FIG. 1 and FIG. 2, this application provides a terminal device with a noise suppression structure. The terminal device may be a mobile electronic device with an antenna such as a mobile phone or a tablet computer. For example, the terminal in this embodiment is a mobile phone 100, and the mobile phone 100 includes an antenna (not shown in the figure), a middle frame 20, a first component 10, a second component 40, and a third component 50. The middle frame 20 includes a metal middle plate 22 and a metal bezel 24, and the antenna (not shown) is disposed on the metal bezel 24 and is located on at the top of the mobile phone 100. The metal middle plate 22 includes a first surface 221 and a second surface 222 opposite to the first surface 221. The first component 10 is mounted on the middle frame 20, and a first cavity 25 is formed between the first component 10 and the first surface 221, as shown in FIG. 3. In this embodiment, the second component 40 and the third component 50 are mounted on a same side of the middle frame 20 and are spaced opposite to the second surface 222. The first component 10 is a display screen, the third component 50 is a battery, and the second component 40 is a circuit board; or the third component 50 is a circuit board, and the second component 40 is a circuit board. In another implementation, the second component 40 or the third component 50 may be spaced from and be disposed on a same side as the first component. The first component 10 may be one of electronic devices in the mobile phone such as a display screen, a circuit board, and a battery. The second component 40 and the third component 50 are one of electronic devices such as a display screen, a circuit board, a battery, and a multimedia device in the mobile phone that may form a cavity with the metal middle plate 22 of the middle frame 20, and have a different function from the first component.

Referring to FIG. 3, the mobile phone 100 includes a noise suppression structure B. The noise suppression structure B in this embodiment is disposed on the metal middle plate 22, the noise suppression structure B includes a hollow region running through the first surface 221 and the second surface 222, and the hollow region communicates with the first cavity 25. Digital signal noise that uses the first cavity 25 as a transmission medium has a propagation path in a direction toward the antenna, the propagation path passes through the hollow region, and the hollow region is used to suppress the digital signal noise transmitted by using the propagation path. It may be understood that the noise suppression structure B is an open-hole slit structure, the propagation path is a noise transmission path that affects operation of an antenna, and the propagation path intersects the hollow region, so as to prevent digital signal noise that affects the antenna from reaching the antenna through the path. Suppression of digital signal noise refers to suppression of noise propagation and changing a noise transmission path, or may be absorption of the noise.

Further, an area of the hollow region has a corresponding change trend relationship with a frequency and a bandwidth of the digital signal noise passing through the hollow region. It may also be understood that different forms of hollow regions are set to suppress the digital signal noise according to frequency and bandwidth characteristics of the digital signal noise. The corresponding change trend relationship is a corresponding change in an area of the hollow region according to a change of a frequency and bandwidth of the digital signal noise, so as to implement targeted suppression. For example, for a point frequency whose digital signal noise frequency is about 1.5 GHz, the hollow region may use a U-shaped aperture structure. If the noise frequency is about 1.7 GHz, a corresponding change trend is that when the U-shaped aperture structure is larger, and a suppression frequency of the U-shaped aperture structure changes. That is, it is understood that digital signal noise of different frequencies may be specially suppressed by designing an area of a hollow region. Specifically, the shape and array arrangement (density) of the hollow region are used to change the area of the hollow region. The hollow region may be designed in a plurality of forms according to a frequency and bandwidth of the digital signal noise that passes through the hollow region, so as to obviously suppress point-frequency noise of a narrow band and broadband noise. For example, a digital signal noise frequency is a point frequency of 1.5 GHz, and the hollow region is a groove structure or a hole structure. If noise increases to 1.7 GHz, the groove structure (hole structure) (may be understood as a slit) needs to be larger, or one groove structure needs to be added, and a suppression frequency of the hole structure changes. That is, it is understood that digital signal noise of different resonance frequencies may be specially suppressed by designing the area of the hollow region.

Specifically, the shape and array arrangement (density) of the hollow region are used to change the area of the hollow region. The hollow region may be designed in a plurality of forms according to a frequency and bandwidth of the digital signal noise that passes through the hollow region, so as to obviously suppress narrowband point-frequency noise and broadband noise. In this embodiment, the hollow region of the noise suppression structure B may be formed in an etching manner, or may be directly stamped and cut in a manufacturing process of the metal middle plate. The location of the noise suppression structure B on the metal middle plate 22 is set according to a transmission path from a digital signal noise transmit point to an antenna location; and is reserved for only digital signal noise that uses the first cavity 25 as a transmission path, or may be reserved for digital signal noise in a cavity generated between another electronic device and the metal middle plate. In this embodiment, a specific location of the noise suppression structure B on the metal middle plate 22 is set for digital signal noise that affects antenna operation and that is transmitted in the first cavity 25. The noise suppression structure B changes a transmission characteristic of the first cavity 25, so that electric field distribution and magnetic field distribution of the digital signal noise are changed when the digital signal noise is transmitted in the cavity, thereby implementing suppression of digital signal noise transmission at a specific frequency. The digital signal noise includes narrowband point-frequency noise and broadband noise. The specific frequency refers to a frequency that affects an operating frequency of the antenna, and may be a frequency of a resonance point, or may be a resonance frequency in a specific range. For example, when the display screen of the mobile phone operates, a common noise signal is generated in the first cavity 25 when the display screen operates. A frequency band transmitted toward the antenna in the noise signal affects an operating frequency band of the antenna in this case, and the noise suppression structure B suppresses transmission of the digital signal noise for impact on the operating frequency band of the display screen. It should be noted that the noise suppression structure is not limited to a middle location of the cavity. In this embodiment, noise is transmitted from the bottom of the mobile phone, and the antenna is disposed at the top of the mobile phone, just through the middle of the first cavity. Actually, the antenna may be located on the left or right or corner. For example, noise is in an upper right corner of the cavity, and the antenna is in an upper left corner of the cavity. The noise suppression structure is disposed in an upper half of the cavity, and extends along a length direction of the mobile phone, so as to ensure that the noise suppression structure is located on a propagation path to the antenna.

In this embodiment, as shown in FIG. 3, the metal middle plate 22 is a rectangular plate body, the metal bezel 24 is disposed around a peripheral side of the metal middle plate 22, the metal bezel 24 and the first surface 221 of the metal middle plate 22 form a first mounting location (not marked in the figure), and the metal bezel 24 and the second surface 222 form a second mounting location (not marked in the figure). Specifically, the first mounting location and the second mounting location are groove structures. The first mounting location and the second mounting location are used to mount electronic devices such as the battery and the display screen. The antenna is disposed on the metal bezel 24 and is located at the top of the mobile phone 100, and a processor of the mobile phone is located at the bottom of the mobile phone. The first component 10 of this embodiment is a display screen. The first component 10 is mounted at the first mounting location of the metal middle frame 20 and has a gap with the first surface 221, that is, the first cavity 25. The second component 40 and the third component 50 are spaced at the second mounting location, the second component 40 may be a battery or a circuit board, and the third component 50 may be a circuit board or a battery. Actually, the first cavity 25 is a slit in a tolerance existing in an assembly process, or a surface of the first component 10 and the first surface 221 are not smooth enough to generate a slit that can be used as a transmission medium in a range. In another implementation, the antenna may also be disposed on a side of the mobile phone, and has a distance from the processor or another noise transmit source, and constitutes a transmission distance of the digital signal noise.

Figure 4:
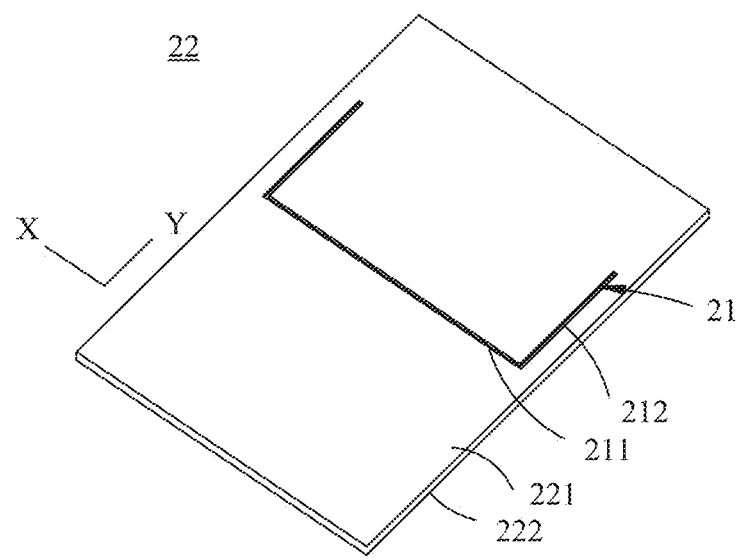
FIG. 4 is a schematic structural diagram of an embodiment of a noise suppression structure on a metal middle plate shown in FIG. 3.

Referring to FIG. 4 at the same time, FIG. 4 is a schematic structural diagram of the metal middle plate. In an embodiment, the hollow region includes a through-slot 21 running through the first surface 221 and the second surface 222, the through-slot 21 includes a strip-shaped first segment 211 and two strip-shaped second segments 212, the first segment 211 extends along a width direction (a direction X in the figure) of the metal middle plate 22, and the two second segments 212 are bent and extend from opposite ends of the first segment 211 to a length direction (a direction Y in the figure) of the metal middle plate 22. The through-slot is approximately a "U"-shaped groove, and is disposed at a substantially middle location of the metal middle plate 22. Specifically, the first segment 211 is located on the transmission path at the middle location of the metal middle plate 22. In this embodiment, the noise suppression structure is formed by using a U-shaped groove, so that noise at around a 2 GHz frequency can be suppressed.

When a width of the through-slot 21 increases and a quantity thereof increases, an area of the hollow region is increased, and digital signal noise at a higher frequency can be suppressed. In an implementation, the quantity of through-slots may be increased. For example, two through-slots are spaced in a length direction of the metal middle plate 22, and the second segment 212 extends in a direction toward the top of the mobile phone, thereby suppressing transmission of noise in a large frequency range in the cavity.

In this embodiment, the noise suppression structure B is disposed on the metal middle plate 20, and the hollow region is formed in a form of a "U"-shaped through-slot, so that electric field distribution and magnetic field distribution of digital signal noise that are transmitted in the cavity change, thereby suppressing digital signal noise that is propagated in a direction toward the antenna A at the top of the mobile phone through the bottom of the mobile phone 100 and that is generated when the first component 10 operates, thereby implementing suppression of digital signal noise transmission at a specific frequency. In addition, it is ensured that the transmission path of the digital signal noise completely passes through the hollow region, so as to prevent some digital signal noise from bypassing, which affects a suppression effect. Certainly, signal noise that affects the antenna, that passes through the hollow region, and that is generated by another electronic device may also be suppressed. In this application, a hollow region is formed in a form of a through-slot to suppress specific digital signal noise that passes through the region, thereby reducing impact on antenna operation. The noise suppression structure B is disposed on the metal middle plate, and does not occupy space and a structure is simple and easy to implement.

Figure 5:
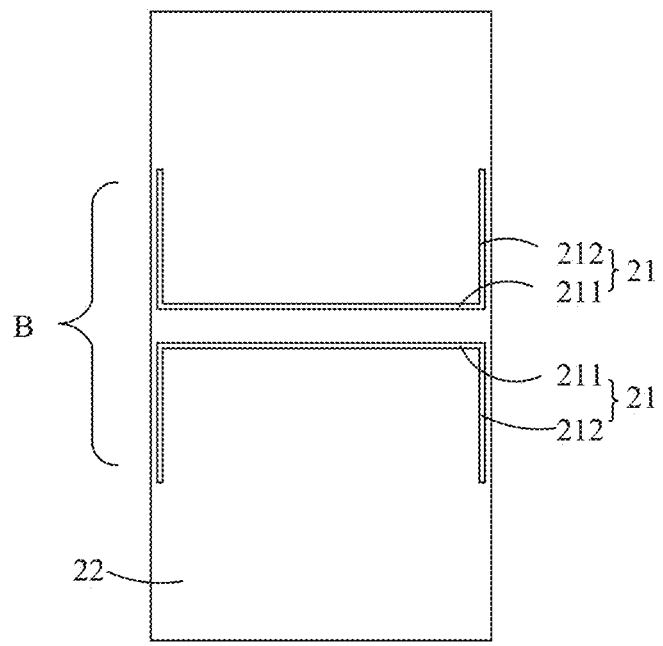
FIG. 5 is a schematic structural diagram of another embodiment of a noise suppression structure on a metal middle plate shown in FIG. 3.

Referring to FIG. 5, in an embodiment, there are two through-slots 21 in the foregoing embodiment, first segments 211 of the two through-slots 21 are spaced in parallel, and extension directions of second segments 212 of the two through-slots 21 are opposite. In this embodiment, a noise suppression structure formed by the two through-slots 21 may generate two fixed-frequency resonance points in the first cavity 25, and may suppress broadband noise transmission in a specific frequency range in the cavity.

Figure 6:
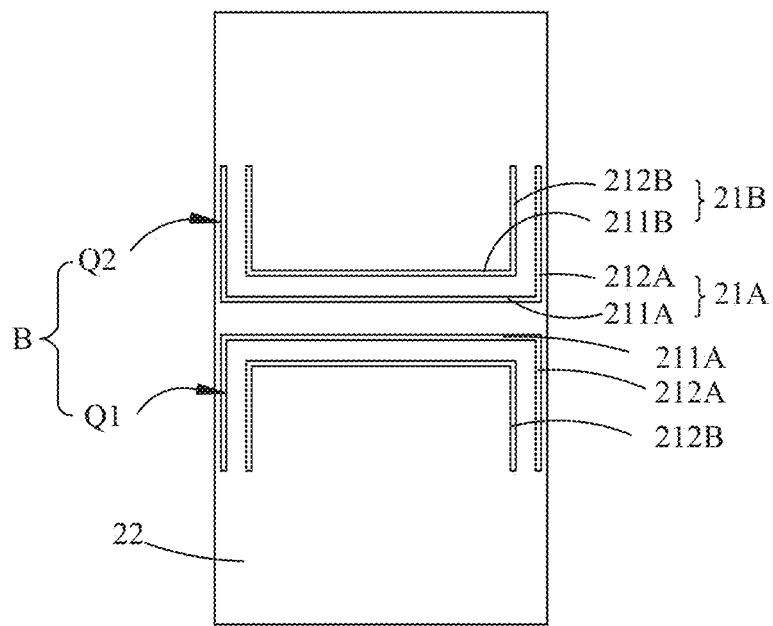
FIG. 6 is a schematic structural diagram of still another embodiment of a noise suppression structure on a metal middle plate shown in FIG. 3.

Referring to FIG. 6, in an embodiment, the hollow region includes two through-slot groups, one through-slot group Q1 and the other through-slot group Q2 both include a first through-slot 21A and a second through-slot 21B, and the first through-slot 21A and the second through-slot 21B are spaced. In another implementation, a quantity of through-slots in each group may be increased, so that transmission of broadband noise in a specific frequency range can be suppressed.

In this embodiment, shapes and structures of the first through-slot and the second through-slot are the same as those of the through-slots in the foregoing embodiment. The first through-slot 21A includes a strip-shaped first segment 211A and two strip-shaped second segments 212A, the first segment 211A extends in a width direction (in a direction X in the figure) of the metal middle plate 22, and the two second segments 212A are bent and extend from opposite ends of the first segment 211A to a length direction (in a direction Y in the figure) of the metal middle plate 22.

The second through-slot 21B has a same structure as but a different size from the first through-slot 21A, the second through-slot 21B includes a first segment 211B and two second segments 212B, the second through-slot 21B is located between the two second segments 212A of the first through-slot 21A and has a same symmetry axis as the first through-slot 21A, and the second segment 212A of the first through-slot 21A has a same extension direction as the second segment 212B of the second through-slot 21B.

Figure 6A:
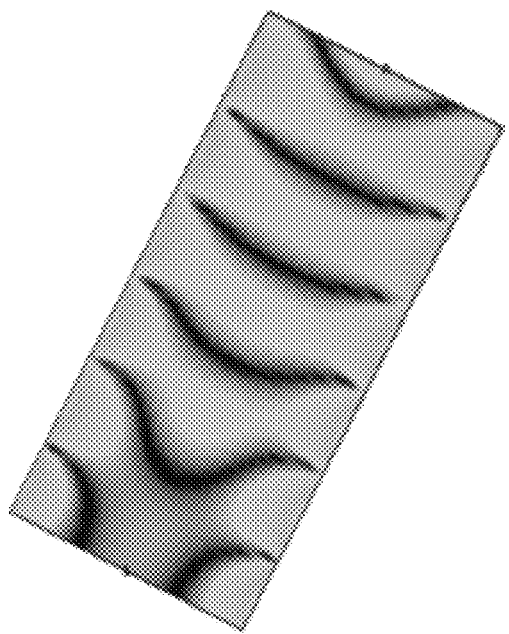
FIG. 6A is a simulation diagram of electric field distribution during noise transmission within a first cavity in which a noise suppression structure is not disposed in a mobile phone.
Figure 6B:
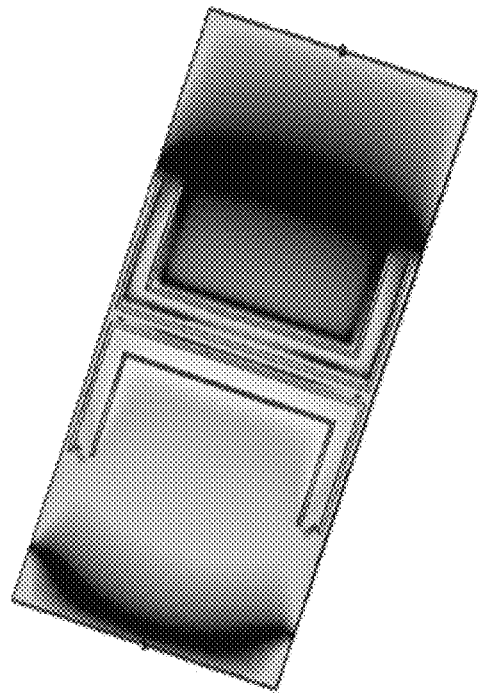
FIG. 6B is a simulation diagram of electric field distribution during noise transmission within a cavity when a noise suppression structure shown in FIG. 6 is disposed on a metal middle plate.
Figure 6C:
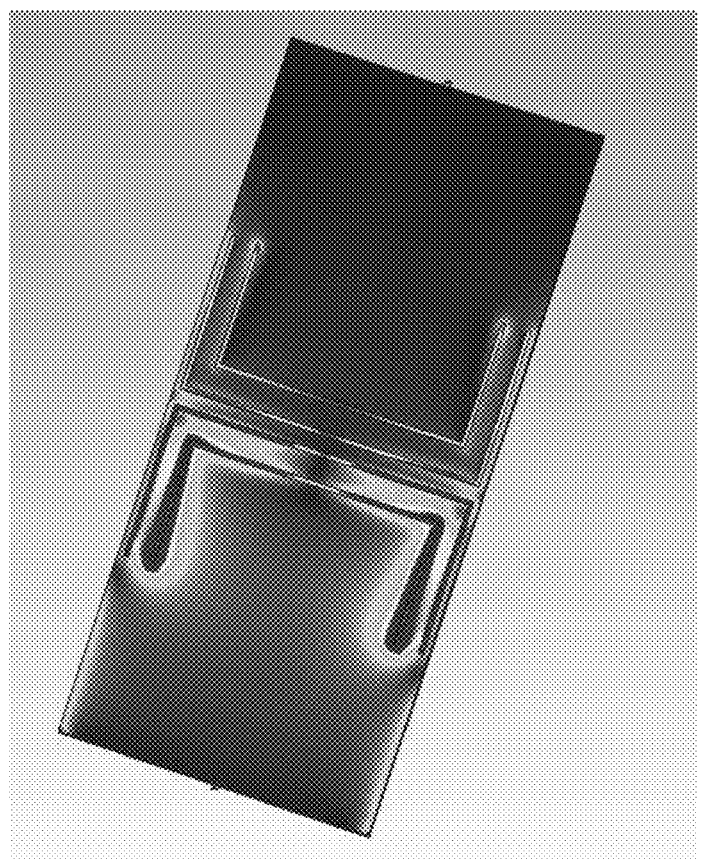
FIG. 6C is a simulation diagram of current distribution during noise transmission within a cavity when a noise suppression structure shown in FIG. 6 is disposed on a metal middle plate.

In the two through-slot groups, a first through-slot 21A of one through-slot group Q1 is spaced from a first through-slot 21A of the other through-slot group Q2, a second segment of the first through-slot of one through-slot group Q1 extends in a direction toward the bottom of the mobile phone, and a second segment of the first through-slot of the other through-slot group Q2 extends in a direction toward the top of the mobile phone. In this embodiment, a quantity of through-slots in the through-slot group may be increased to form a larger array. By increasing the quantity of through-slots in the "U-shaped array", suppression of broadband noise can be enhanced. Suppression may be further implemented for a larger resonance frequency by changing the overall (first and second segments) width of the through-slots within the through-slot group. Referring to FIG. 6A, FIG. 6B, and FIG. 6C, FIG. 6A is a simulation diagram of electric field distribution in a first cavity in which a noise suppression structure is not disposed in a mobile phone. From a simulation result, it is considered that noise transmission from a bottom end 1 to a top end 2 is in a fully-connected state, and the noise may be transmitted without loss in the cavity. FIG. 6B is a simulation diagram of electric field distribution of a cavity in which a noise suppression structure in this embodiment is disposed on a metal middle plate. FIG. 6C is a simulation diagram of current distribution in a cavity when a noise suppression structure in this embodiment is disposed on a metal middle plate. The noise suppression structure changes surface current and electric field distribution inside the cavity. Noise transmission from the bottom end to the top end (from the bottom end to the top end of the metal middle plate in the figure) generates obvious suppression.

In an embodiment, the noise suppression structure B includes a plurality of holes running through the metal middle plate 22, and the plurality of holes are spaced regularly to form the hollow region. An axial cross-sectional contour of each of the holes is a regular polygon or a circular shape. The axial cross-sectional contour of the hole is a regular polygon such as a cross shape, a double cross shape, a rectangle, and a prism. A regular arrangement generally refers to a matrix arrangement or a circular or another regular arrangement, provided that digital noise that affects operating performance of the antenna can be suppressed.

Figure 7:
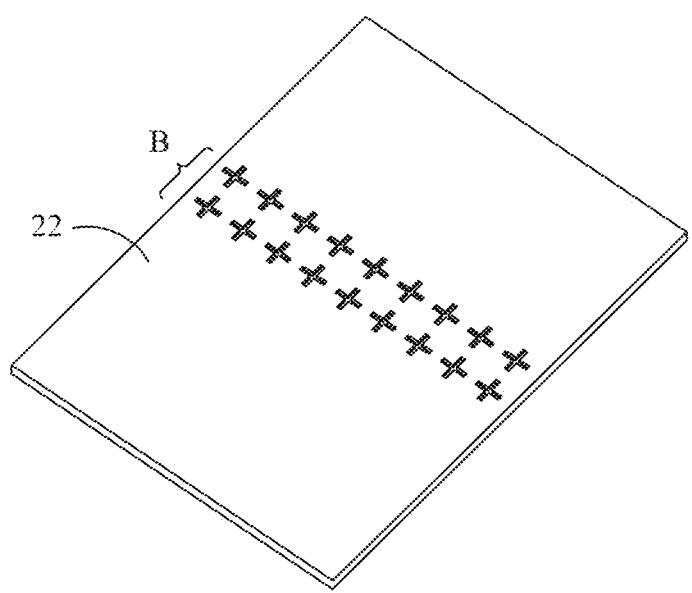
FIG. 7 is a schematic structural diagram of an embodiment of a noise suppression structure on a metal middle plate shown in FIG. 3.

Referring to FIG. 7, in this embodiment, the noise suppression structure B includes several holes whose axial cross-sectional contour is a "cross" shape, and the holes are arranged in a matrix, and are specifically arranged in two columns and extend along a width direction of the metal middle plate 22. A length of the array formed by the holes is the same as or close to a length of the metal middle plate 22, and location of the holes are disposed on the premise that a peripheral edge of the metal middle plate 22 is normally connected to the metal middle frame 20, so as to maximize suppression of digital signal noise. The holes are spaced in two columns according to a specific embodiment, each column has nine holes, and a spacing a between the two columns of holes is 3 mm. The noise suppression structure B in this embodiment can suppress digital signal noise near a 32 GHz frequency that propagates in a direction toward the antenna at the top of the mobile phone through the bottom of the mobile phone. A propagation path of the digital signal passes through and completely passes through the hollow region, that is, no part of the propagation path avoids the hollow region, so as to ensure that the digital signal noise is effectively suppressed. A noise suppression structure of a cross-shaped hole structure can suppress larger broadband noise transmission. In the foregoing embodiment, in a hollow region formed by several holes, when an area of a cross-section of the hole is increased, that is, a larger density is provided for the holes, thereby improving a suppression effect of the noise suppression structure B. It should be noted that this embodiment merely enumerates a hollow structure in which only one frequency is suppressed. For noise at another frequency, for example, noise at a higher frequency such as 3 GHz, 5 GHz, and 10 GHz, noise may be correspondingly suppressed by adjusting an area and a shape of the hollow region in any one of the foregoing embodiments.

In an embodiment, the noise suppression structure B is a strip-shaped through-slot (not shown) running through the metal middle plate 22. The hollow region is the through-slot, and there are one or more through-slots. A structure of the noise suppression structure B in this embodiment is simple, and is applicable to suppressing digital signal noise corresponding to a resonance point. Certainly, an area and a quantity of the through-slots are increased to increase a range of suppressing digital signal noise.

Figure 8:
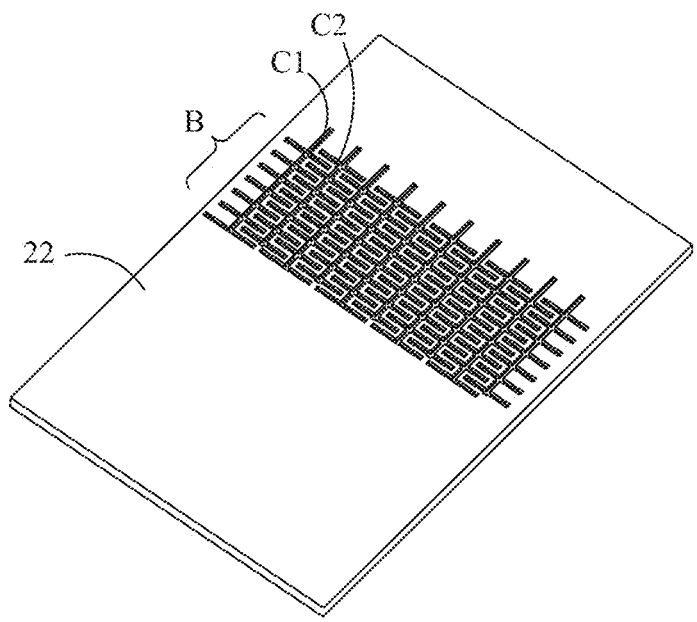
FIG. 8 is a schematic structural diagram of an embodiment of a noise suppression structure on a metal middle plate shown in FIG. 3.

Referring to FIG. 8, in an embodiment, the noise suppression structure B includes a plurality of slits running through the metal middle plate 22, each of the slits extends in a curved way, and the plurality of slits are regularly arranged to form the hollow region. A hollow region is formed by using a plurality of slits extending in a curved way, so that a structure of the hollow region is complicated, and a suppression range of the noise suppression structure B to digital signal noise is increased within a specific unit area. The slits may cross-extend or may extend in parallel in a same direction. In an implementation, the plurality of slits have same extension directions (the same extension direction or the same trend) and are spaced. In an implementation, the plurality of slits have consistent extension directions and are arranged side by side, and two adjacent slits communicate with each other head to tail. In this embodiment, the slits extend in a serpentine shape, every adjacent slit communicate with each other head to tail, and two slits may be considered as one group. A plurality of groups of slits C1 are disposed on the metal middle plate 22. Each group includes two slits, and an entity curved frame C2 is formed between two adjacent slits, and is used to separate two slits C1. The two slits C1 share one frame and have a communication region. This structure does not need to cut more parts on the metal middle plate 22, so that strength of the middle plate is ensured. In the noise suppression structure B in this embodiment, by setting a hollow region of a complex structure, not only cavity transmission suppression for digital signal noise at a fixed frequency can be implemented, but also cavity transmission suppression for ultra-wideband digital signal noise can be implemented.

According to the terminal device with a noise suppression structure described in this embodiment, a hollow region is disposed on the metal middle plate 22 of the middle frame 20, so as to change a transmission characteristic of a cavity that is formed by the metal middle plate 22 and another electronic device, and the hollow region is located on a transmission path connected to an antenna of the terminal, so that electric field distribution and magnetic field distribution of digital signal noise that are generated by an electronic device such as a display screen are changed when the digital signal noise is transmitted on the transmission path in the cavity. The hollow region may suppress a part of the digital signal noise, so that digital signal noise transmission at a specific frequency on the transmission path is suppressed, thereby avoiding impact on antenna performance.

Figure 9:
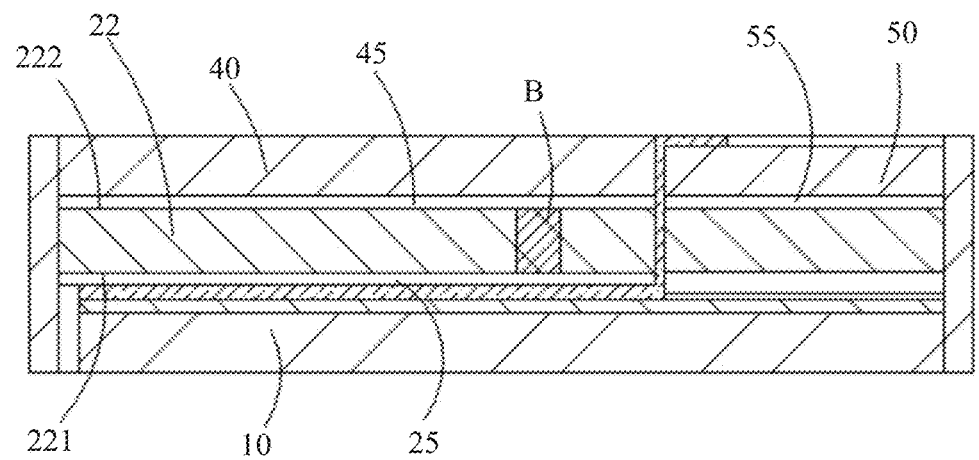
FIG. 9 is a schematic diagram of an internal side of a partial structure of the terminal device with a noise suppression structure shown in FIG. 1 in a length direction, where a second cavity is formed.

Referring to FIG. 9, in another embodiment, on the basis of the foregoing embodiment, a second cavity 45 is formed between the second component 40 and the second surface 222. The second component 40 is a circuit board, and digital signal noise is generated when the second component 40 operates, and is transmitted by using the second cavity. The second cavity 45 is spaced from the first cavity 25, and the hollow region of the noise suppression structure B communicates with the second cavity 45. Similarly, the noise suppression structure B may suppress digital signal noise on the other side of the middle frame 20 and that uses the second cavity 45 as a transmission path. An additional noise suppression structure is not required, and a terminal structure is simplified and processing difficulty is reduced. Specifically, the second component 40 is located at a second mounting location, the second cavity 45 and the first component 10 are located on opposite sides of the metal middle plate 22, and the second cavity 45 and the first cavity 25 are spaced by using the metal middle plate 22. The hollow region communicates with both the first cavity 25 and the second cavity 45, and digital signal noise transmitted by using the first cavity 25 and the second cavity 45 can be suppressed. In another implementation, the second component 40 is located at the first mounting location, forms a second cavity with the first surface 221, and is disposed side by side with the first component 10, and the first cavity 25 and the second cavity are spaced.

In still another embodiment, a third cavity 55 is formed between the third component 50 and the second surface 222. The third component 50 is a battery. The third cavity 55 is spaced from the first cavity 25 and the second cavity 45, and the hollow region of the noise suppression structure B communicates with the third cavity 55. When the third component 50 operates, digital signal noise is generated and transmitted by using the third cavity, and the hollow region of the noise suppression structure B can also suppress the digital signal noise in the third cavity 55. An additional noise suppression structure B is not required, and a terminal structure is simplified and processing difficulty is reduced. The third cavity 55 and the first cavity 25 or the second cavity may be on a same side of the metal middle plate 22, or may be on opposite sides of the metal middle plate 22. It should be noted that, in the foregoing two embodiments, an auxiliary noise suppression structure similar to that of the noise suppression structure B may be additionally disposed at locations corresponding to the second cavity and the third cavity in the metal middle plate 22, so as to respectively suppress digital signal noise in different frequency bands transmitted by the corresponding second cavity 45 and third cavity 55, and more specially implement noise suppression.

Figure 10:
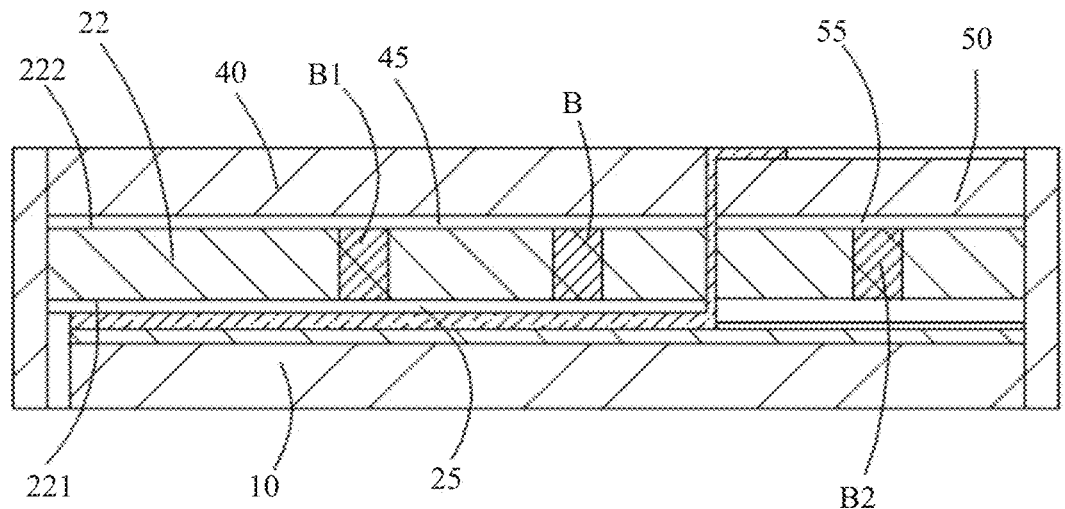
FIG. 10 is a schematic diagram of an internal side of a partial structure of the terminal device with a noise suppression structure shown in FIG. 1 in a length direction, where a second cavity and a third cavity are formed.

As shown in FIG. 10, in an embodiment, based on an embodiment in which the mobile phone 100 includes the second component 40 and the third component 50 that are mounted on the middle frame 20, the second cavity 45 and the third cavity 55 are spaced side by side, and a first noise suppression structure D1 and a second noise suppression structure D2 that have a same structure as the noise suppression structure B are disposed at locations on the metal middle plate 22 and opposite to the second cavity 45 and the third cavity 55 respectively, and the noise suppression structure B is located between the first noise suppression structure D1 and the second noise suppression structure D2. In this embodiment, the second component 40 and the third component 50 are mounted at the second mounting location B, and the second mounting location is two independent mounting slots. The first component 10 is a display screen, the third component 50 is a battery, and the second component 40 is a circuit board. For example, when the antenna of the terminal is located on a top display screen, a signal is transmitted from the bottom of the terminal. Digital signal noise generated when the battery, the circuit board, and the display screen are operating is propagated in plurality of paths in the first cavity 25, the second cavity 45, and the third cavity 55. The noise suppression structure B, the first noise suppression structure D1, and the second noise suppression structure D2 are respectively disposed on a propagation path toward the antenna for the first cavity 25, the second cavity 45, and the third cavity 55, and noise suppression structures may be specially disposed for digital signal noise generated by the electronic device. In this way, digital signal noise generated when the battery, the circuit board, and the display screen are operating is suppressed, and noise affecting a corresponding operating frequency of the antenna is particularly targeted. In this way, impact of digital signal noise on operating performance of the antenna in the frequency band can be reduced or prevented.

In an embodiment, as shown in FIG. 3, the first component 10 is a display screen, the display screen includes a metal backplane 13 opposite to the first surface 221, and the metal backplane 13 is further provided with the noise suppression structure (not shown). The noise suppression structure may be the noise suppression structure B described in any one of the foregoing embodiments. In this embodiment, on the basis of the foregoing embodiment, a noise suppression structure is also disposed on the back of the display screen, so that noise generated on the display screen can be suppressed, thereby improving a suppression effect.

Figure 11:
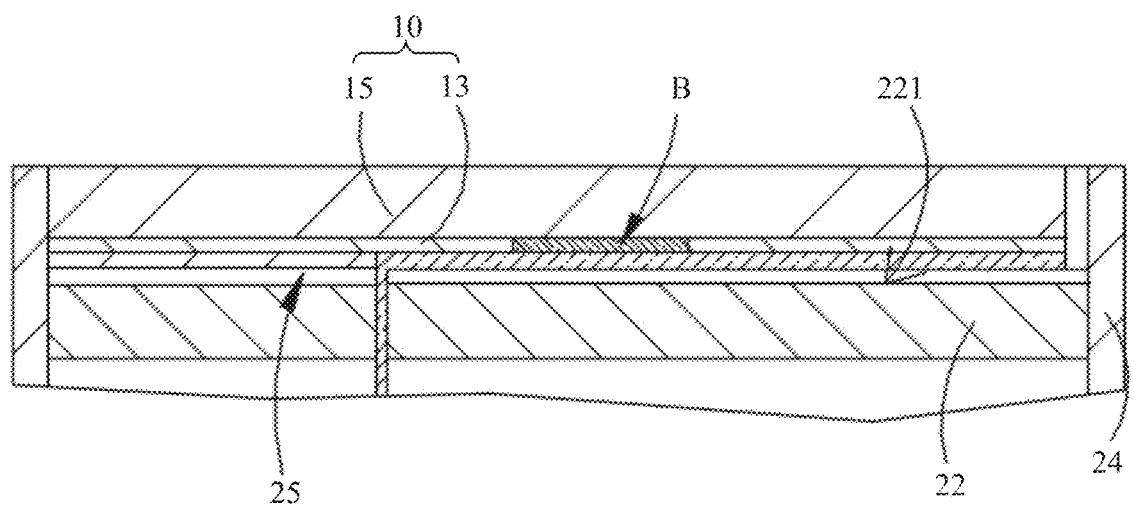
FIG. 11 is a schematic diagram of an internal side structure of another embodiment of a terminal device with a noise suppression structure shown in FIG. 1.

Referring to FIG. 11, in another embodiment of the terminal device with a noise suppression structure in this application, different from the foregoing embodiment, the noise suppression structure B is disposed only on the display screen. Specifically, the display screen 10 includes a metal backplane 13, the antenna A is disposed on a top edge of the middle frame 20, the middle frame 20 includes a first surface 221 and a second surface 222 opposite to the first surface 221, the display screen is mounted on the middle frame 20, and a cavity (a first cavity) is formed between the metal backplane 13 and the first surface 221. The noise suppression structure B is disposed on the metal backplane 13, the noise suppression structure B includes a hollow region running through the metal backplane 13, and the hollow region communicates with the cavity. Digital signal noise generated by the display screen is propagated in a direction toward the antenna by using the first cavity 25 as a transmission medium, and passes through the hollow region, where the hollow region is used to suppress digital signal noise transmitted by using the propagation path.

In the terminal in this embodiment, a noise suppression structure B is disposed on a metal backplane 13 of a display screen 20, so as to change a transmission characteristic of a cavity that is formed in the metal backplane 13, and the hollow region is located on a transmission path connected to an antenna of the terminal, so that electric field distribution and magnetic field distribution of digital signal noise are changed when the digital signal noise is transmitted on the transmission path in the cavity. The hollow region can suppress a part of the digital signal noise, so that digital signal noise transmission at a specific frequency on the transmission path is suppressed. In this embodiment, the noise suppression structure B is directly disposed on the back of the display screen 20, so as to suppress digital signal noise generated by the display screen, and a better suppression effect can be achieved.

In conclusion, in the terminal described in this application, a noise suppression structure B is disposed on a middle frame 20, which is corresponding to a cavity formed by the middle frame 20 and an electronic device such as a first component 10, so as to suppress digital signal noise generated when the terminal operates, so as to reduce impact of digital signal noise on antenna operating performance, so as to resolve a technical problem of lossless digital signal noise transmission inside a mobile phone.

To understand the foregoing embodiments of this application more clearly, the following describes the terminal device with a noise suppression structure in more detail by using a specific embodiment. In this embodiment, for example, a noise suppression structure B is disposed on a display screen 10.

Figure 12:
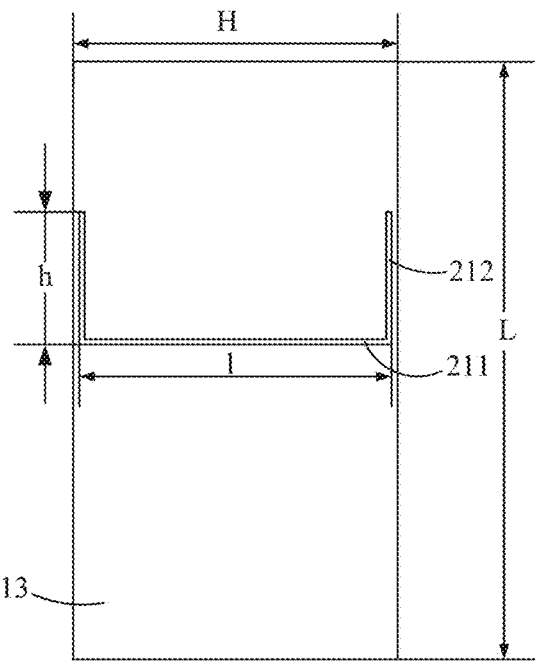
FIG. 12 is a schematic diagram of an embodiment of a metal backplane of a display screen of a terminal shown in FIG. 11.

Referring to FIG. 2, FIG. 11, and FIG. 12, the middle frame 20 is a rectangular structure, and the first mounting location A is a rectangular groove structure. The display screen 20 includes the metal backplane 13 and a display component 15 mounted on a side of the metal backplane 13, and the display component 15 is configured to display a picture. The display screen is mounted at the first mounting location of the middle frame 20, and the display screen is fastened to the first mounting location of the middle frame 20 in a manner of adhesive or the like. The metal backplane 13 is disposed opposite to the metal middle plate 22, and a first cavity 25 is generated between the metal backplane 13 and the first surface 221 of the metal middle plate 22. Actually, the first cavity 25 is a slit in a tolerance that exists in an assembly process. In this embodiment, a processor of the mobile phone 100 is located at the bottom of the mobile phone, the antenna A is located at the top of the mobile phone, and the antenna is in a specific distance from the processor, and constitutes a transmission distance of digital signal noise. The first segment 211 is located at a middle location in a width direction of the metal backplane 13, and the second segment 212 extends toward a top direction of the mobile phone. The middle location may be a region or may be a line. In this embodiment, the middle location of the metal backplane 13 is a region that coincides with an orthographic projection of the first segment 211. It may also be understood that the first segment is a line, and the middle location is a middle line of the metal backplane. The bottom of the mobile phone 100 and the top of the mobile phone refer to directions of the mobile phone when a user answers a call.

Figure 13:
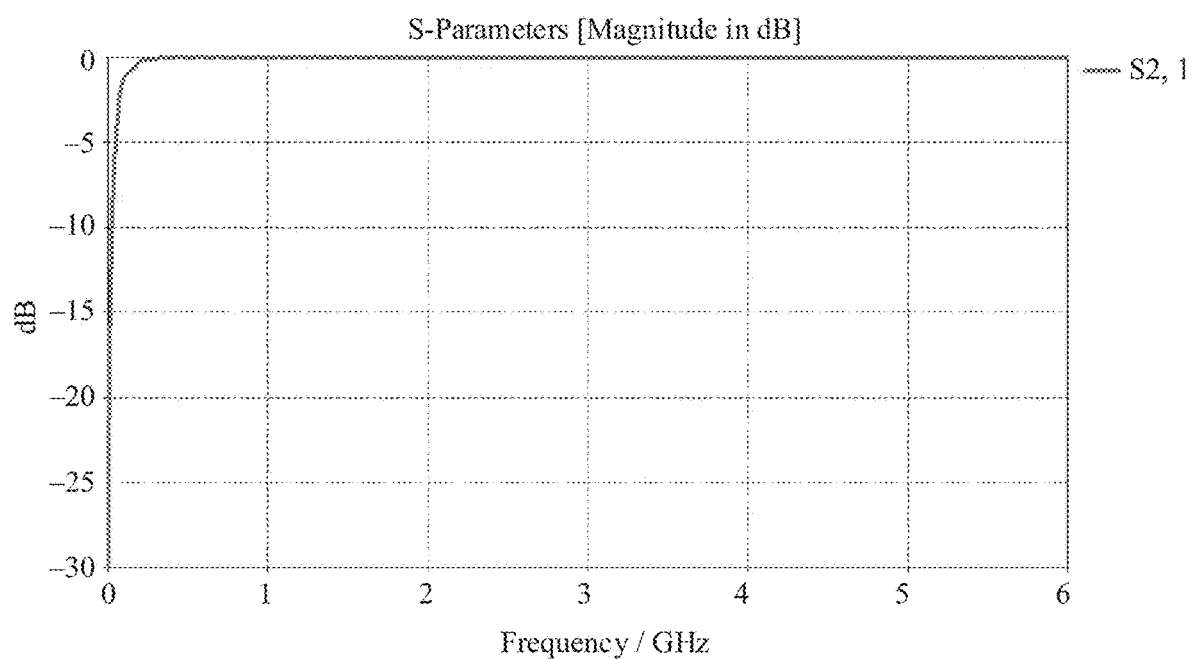
FIG. 13 is a simulation diagram of operation of a display screen of a terminal that is not provided with a noise suppression structure.
Figure 14:
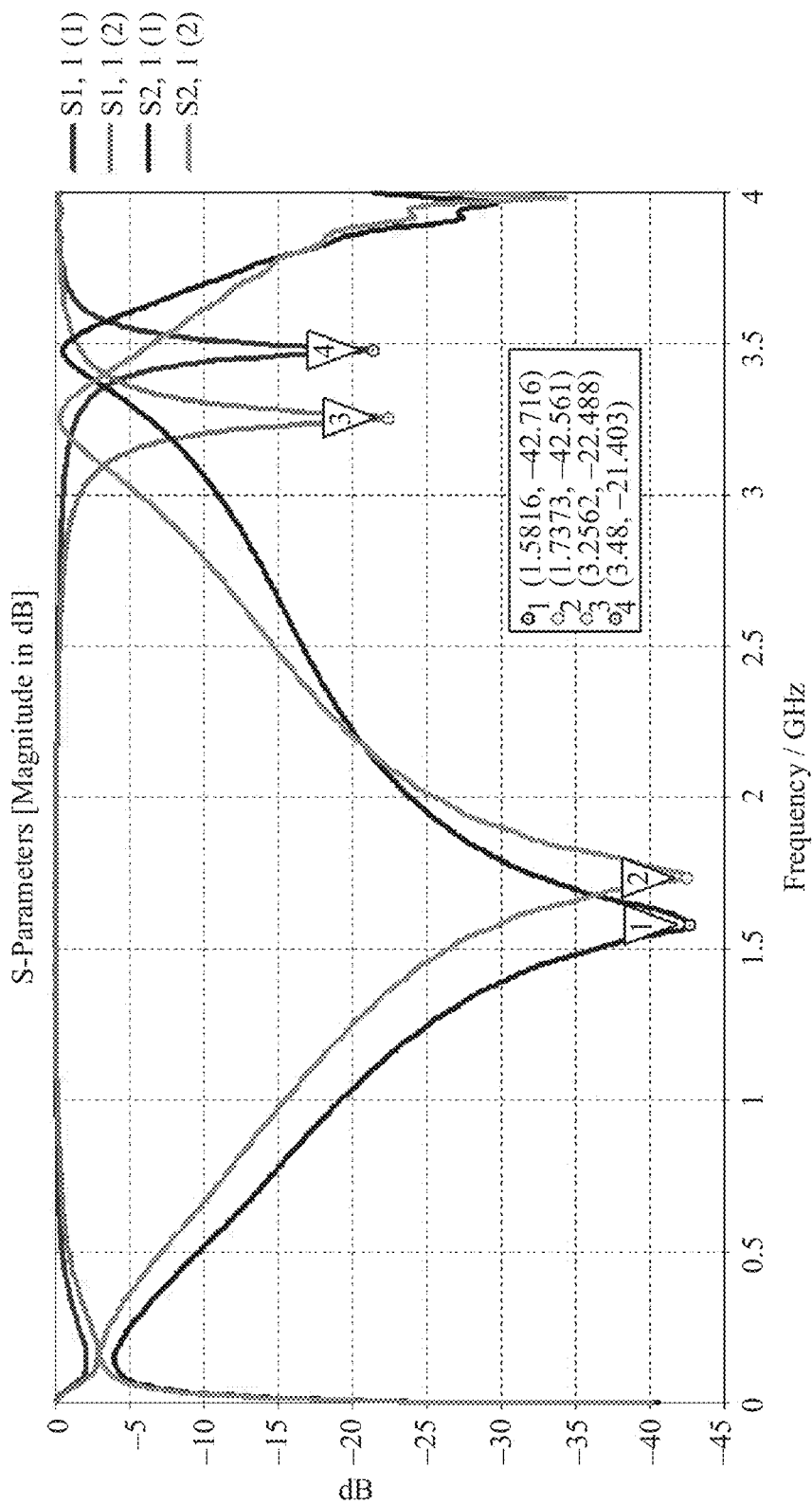
FIG. 14 is a simulation diagram of operation of a display screen provided with a noise suppression structure shown in FIG. 12.

Specifically, as shown in FIG. 12, for example, a length L of the first cavity 25 of the mobile phone is 160 mm, a width H thereof is 75 mm, and a thickness of the cavity (a spacing between the first surface 221 and the metal backplane) is 0.4 mm. The through-slot 21 is a "U"-shaped slot, and the first segment 211 and the second segment 212 are rectangular through-slot structures. In this embodiment, the first segment 211 and the second segment 212 are disposed vertically. Sidewalls of the first segment 211 and the second segment 212 in the Y direction are of a planar structure, and it may be understood that a surface of the sidewall is a planar surface. A length l of the first segment 211 is 72 mm, and a length h of the second segment 212 is 35.5 mm. Therefore, slot widths of the first segment 211 and the second segment 212 are 1 mm, and slot widths are sizes perpendicular to a length direction of the first segment 211 and the second segment 212. Referring to FIG. 13 and FIG. 14, FIG. 13 is a simulation diagram of operation of a display screen of a terminal that is not provided with a noise suppression structure, and FIG. 14 is a simulation diagram of operation of a noise suppression structure in this embodiment. It may be learned from FIG. 13 that main-mode transmission of a cavity presents a full-pass characteristic, and noise whose frequency is higher than a cut-off frequency may be transmitted without loss in the first cavity. As shown in FIG. 14, by implementing a "U-shaped" noise suppression structure at the middle location of the metal backplane 15 of the display screen 10, a feature mode transmission characteristic of an original cavity is changed, so that electric field distribution and magnetic field distribution of noise at around a 2 GHz frequency change when the noise is transmitted in the first cavity, thereby implementing cavity noise transmission suppression at a specific frequency. From simulation in FIG. 14, it may be learned that a "U-shaped" hollow structure may generate a resonance point S11 (1) at a fixed frequency in the first cavity 25, and S21 (1) corresponding to a sideband suppression effect of the "U-shaped" hollow structure may produce a suppression effect of more than 40B on noise transmission at a 1.58 GHz frequency in the cavity. Further, a resonance frequency corresponding to a noise frequency can be generated in the cavity by adjusting a width of the "U-shaped" hollow structure (the through-slot 21), a length of the first segment 211, or a length of the second segment, so as to suppress cavity transmission of specific-frequency noise. For example, S11 (2) is to change the width of the through-slot from 1 mm to 2 mm, and the resonance frequency changes. Corresponding S21 (2) may produce a suppression effect of more than 40B on noise transmission at a 1.73 GHz frequency in the cavity.

Figure 15:
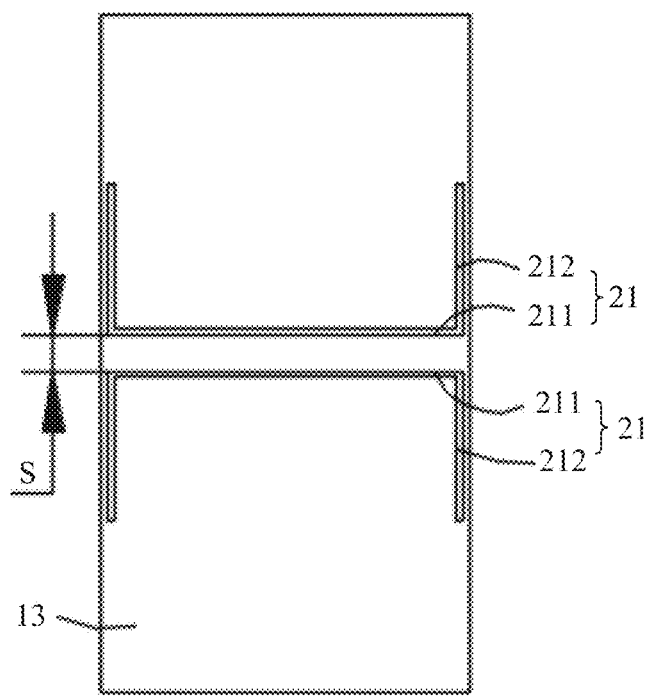
FIG. 15 is a schematic diagram of another embodiment of a metal backplane of a display screen of a terminal device with a noise suppression structure shown in FIG. 11.
Figure 16:
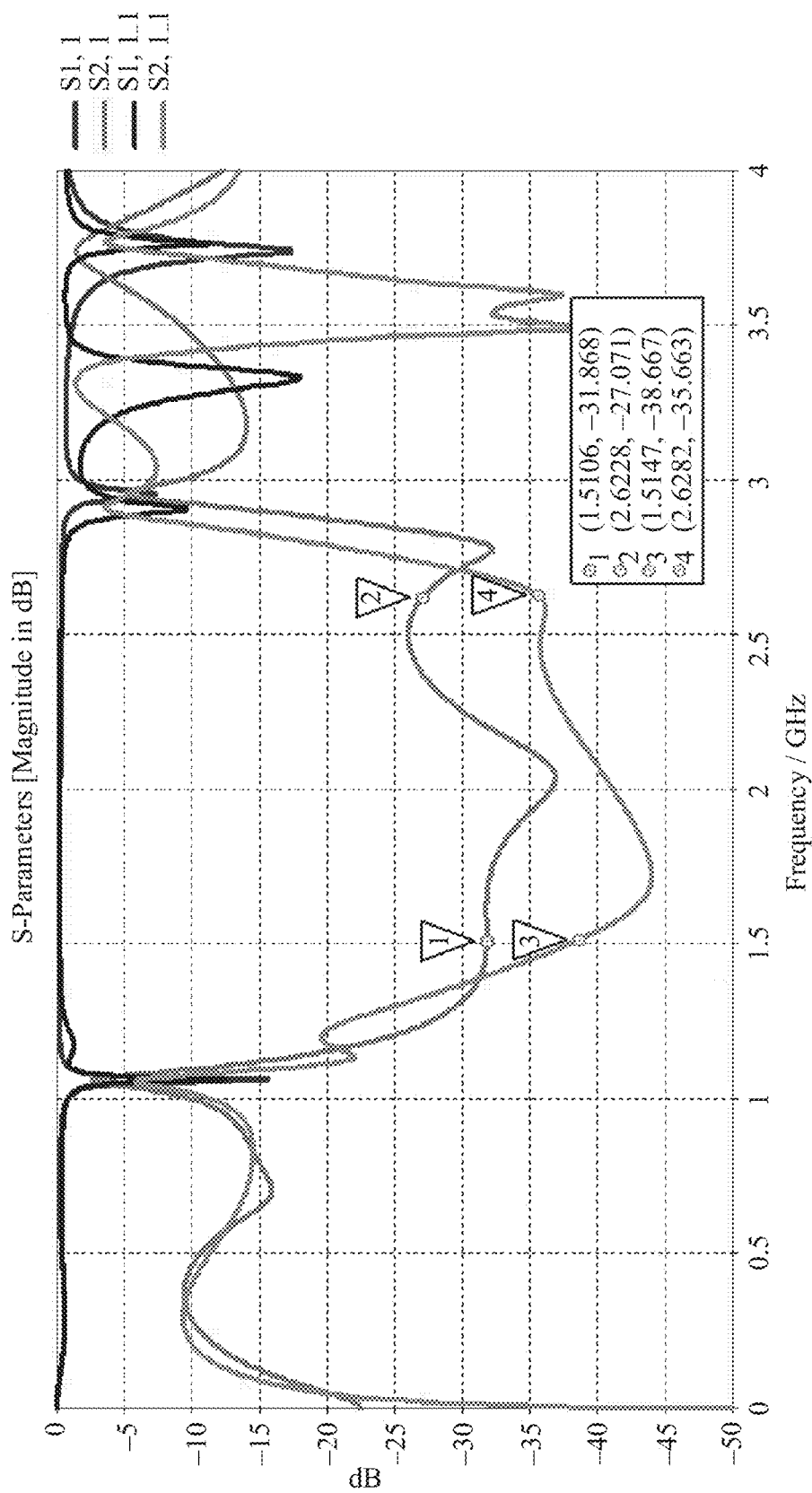
FIG. 16 is a simulation diagram of operation of a display screen provided with a noise suppression structure shown in FIG. 15.

In another embodiment, referring to FIG. 15 and FIG. 16, FIG. 15 is a schematic planar diagram of a metal backplane, and the noise suppression structure shown in FIG. 4 is applied thereto. For example, a length L of the first cavity 25 is 160 mm, a width H thereof is 75 mm, and a thickness of the cavity (a spacing between the first surface 221 and the metal backplane) is 0.4 mm. A difference between this embodiment and the embodiment in FIG. 11 is that there are two through-slots 21 in the foregoing embodiment, first segments 211 of the two through-slots 21 are spaced in parallel, and extension directions of second segments 212 of the two through-slots 21 are opposite. First segments 21 of the two through-slots 21 are spaced in parallel, and a spacing S is 3.5 mm. From simulation in FIG. 16, it can be learned that the hollow structure formed by the two through-slots in this embodiment may generate fixed-frequency resonance points S1.1 and S1.1_1 in the cavity, and the resonant points S1.1 and S1.1_1 may suppress broadband noise transmission in a frequency range of 1.5-2.6 GHz in the cavity by more than −25 dB.

Figure 17:
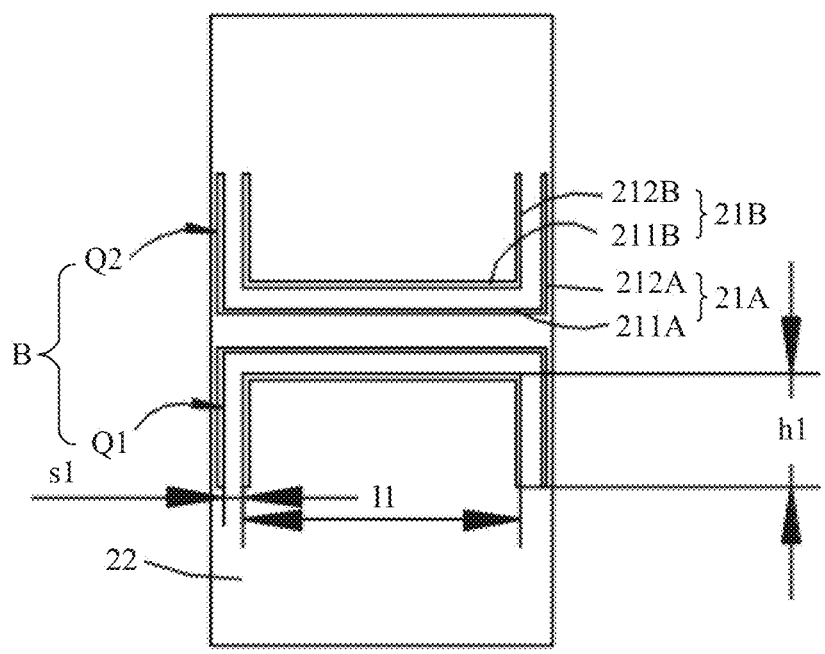
FIG. 17 is a schematic diagram of another embodiment of a metal backplane of a display screen shown in FIG. 15.

Referring to FIG. 17, FIG. 17 is a diagram in which a through-slot array is disposed based on the embodiment shown in FIG. 15, which is specifically the same as the noise suppression structure in the embodiment shown in FIG. 6. The hollow region of the metal backplane 13 includes through-slot groups, and both one through-slot group Q1 and the other through-slot group Q2 include a first through-slot 21A and a second through-slot 21B. The first through-slot 21A is the same as the through-slot shown in FIG. 12. A length l of the first segment 211A is 72 mm, and a length h of the second segment 212 is 35.5 mm. Therefore, slot widths of the first segment 211A and the second segment 212A are 1 mm. A length l1 of a first segment 211B of the second through-slot 21B in this embodiment is 60 mm, a length h1 of two second segments 212B is 28.5 mm, and a spacing s1 between the first through-slot 21A and the second through-slot 21B is 5 mm. A distance between the two through-slot groups is a distance between the two first through-slots, and a spacing is 3.5 mm, that is, a distance between the first segment 211A and the first segment 211B is 3.5 mm. Suppression of broadband noise may be enhanced by using a through-slot in an array form. From simulation in FIG. 16, it can be learned that the hollow structure formed by the two through-slots in this embodiment may generate fixed-frequency resonance points S2.1 and S2.1_1 in the cavity, and the resonant points S2.1 and S2.1_1 may suppress broadband noise transmission in a frequency range of 1.5-2.6 GHz in the cavity by more than −35 dB. Noise suppression strength is increased by increasing the area of the hollow region.

Figure 18:
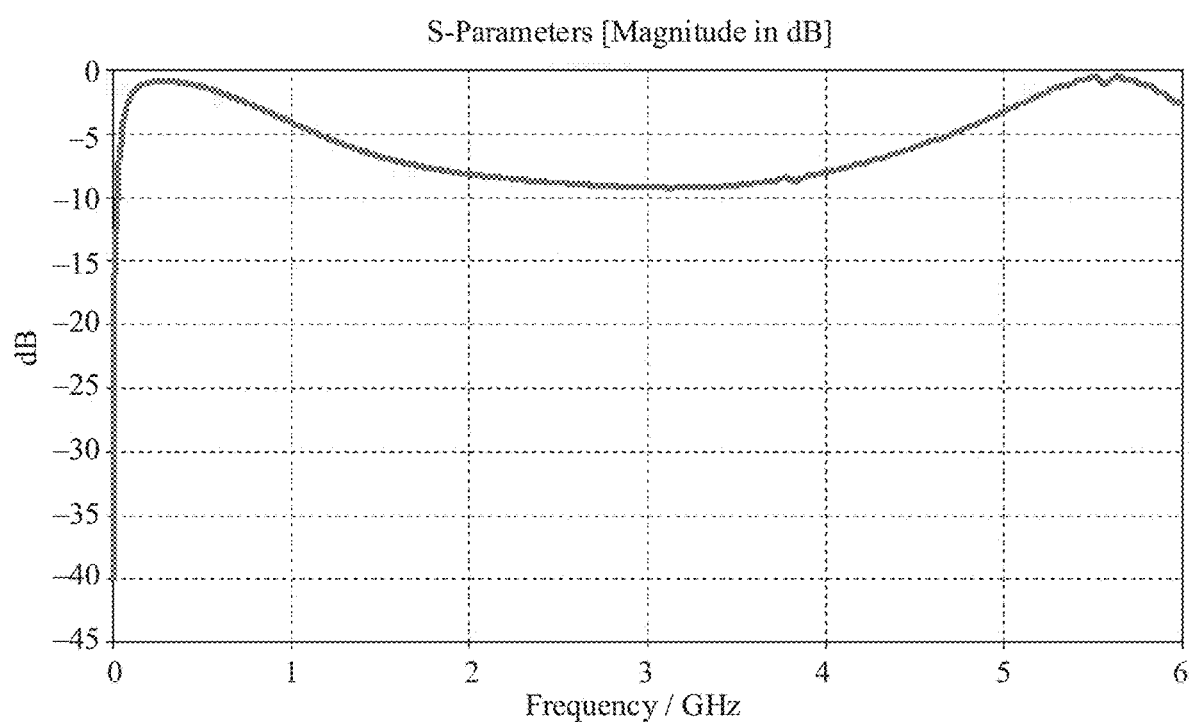
FIG. 18 is a simulation diagram of a metal backplane of the display screen shown in FIG. 11 that includes the noise suppression structure shown in FIG. 8.

In an embodiment, different from the foregoing embodiment, the noise suppression structure B on the metal backplane includes a plurality of slits C1 running through the metal backplane. The noise suppression structure shown in this embodiment is the noise suppression structure in the embodiment shown in FIG. 8, but the structure is disposed on the metal backplane of the display screen. Each of the slits extends in a curved way, and the plurality of the slits C1 are regularly arranged to form the hollow region. In this embodiment, the slits extend in a serpentine shape, every two adjacent slits are symmetrically arranged, and every two adjacent slits are connected head to tail to form a group. An overall length direction of the slit C1 is consistent with the width direction of the metal backplane 13. In this embodiment, a length of the first cavity 25 is 160 mm, a width of the first cavity is 75 mm, and a thickness of the cavity (a spacing between the first surface 221 and the metal backplane) is 0.4 mm. Correspondingly, the hollow region is a slit of nine groups of serpentine lines, a width of each group of serpentine line slits C1 is 0.2 mm, the group of slits has 12 bending locations, and the noise suppression structure B is located at the middle location of the metal middle plate 22. Referring to FIG. 18, FIG. 18 is a simulation diagram of a transmission frequency of digital signal noise in a cavity under the noise suppression structure B in this embodiment. A resonance frequency of the first cavity 25 presents an ultra-wideband characteristic, and has a suppression effect of 7-10 dB on wideband noise at around 2 GHz. In this embodiment, by providing the metal backplane with a hollow region having a complex form and a large density, not only cavity transmission suppression for fixed-frequency noise can be implemented, but also cavity transmission suppression for ultra-wideband noise can be implemented.

The foregoing descriptions are merely parts of embodiments and implementations of this application, and are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A terminal device, comprising:
    a noise suppression structure that includes an antenna, a middle frame, and a first component,
    wherein the middle frame comprises a metal middle plate and a metal bezel, the antenna is disposed on the metal bezel, the metal middle plate comprises a first surface and a second surface opposite to the first surface, the first component is mounted on the middle frame, and a first cavity is formed between the first component and the first surface;
    wherein the noise suppression structure is disposed on the metal middle plate, the noise suppression structure comprises a hollow region running through the first surface and the second surface, and the hollow region communicates with the first cavity;
    wherein digital signal noise is generated based on the first component working, wherein the digital signal noise uses the first cavity as a transmission medium and has a propagation path in a direction toward the antenna, the propagation path passes through the hollow region, and the hollow region is used to suppress the digital signal noise transmitted in the propagation path; and
    wherein the first component is a display screen, the display screen comprises a metal backplane opposite to the first surface, and the metal backplane is provided with a backplane noise suppression structure, wherein the backplane noise suppression structure comprises a second hollow region running through the metal backplane.

2. The terminal device according to claim 1, wherein an area of the hollow region corresponds with a change in a frequency and a bandwidth of the digital signal noise passing through the hollow region.

3. The terminal device according to claim 2,
    wherein the hollow region comprises a through-slot running through the first surface and the second surface, the through-slot comprises a strip-shaped first segment and two strip-shaped second segments; and
    wherein the first segment extends along a width direction of the metal middle plate, and the two second segments are respectively bent and extend from two opposite ends of the first segment toward a length direction of the metal middle plate.

4. The terminal device according to claim 3,
    wherein the hollow region comprises a second through-slot running through the first surface and the second surface, wherein the second through-slot comprises a strip-shaped first segment and two strip-shaped second segments; and
    wherein first segments of the through-slot and the second-through slot are spaced in parallel, and extension directions of second segments of the through-slot and the second-through slot are opposite.

5. The terminal device according to claim 2, wherein the hollow region comprises two through-slot groups, each through-slot group of the two through-slot groups comprises a first through-slot and a second through-slot, and the first through-slot and the second through-slot are spaced;
wherein, for a given through-slot group of the two through-slot groups, the first through-slot comprises a strip-shaped first segment and two strip-shaped second segments, the first segment of the first through-slot extends along a width direction of the metal middle plate, and the two second segments of the first through-slot are respectively bent and extend from two opposite ends of the first segment of the first through-slot toward a length direction of the metal middle plate;
wherein, for the given through-slot group of the two through-slot groups, the second through-slot has a same structure as but a different size from the first through-slot, the second through-slot comprises a first segment and two second segments, the second through-slot is located between the two second segments of the first through-slot and has a same symmetry axis as the first through-slot, and the second segment of the first through-slot has a same extension direction as the second segment of the second through-slot; and
wherein in the two through-slot groups, a first through-slot of one through-slot group is spaced from a first through-slot of the other through-slot group, and an extension direction of a second segment of one first through-slot is opposite to that of a second segment of the other first through-slot.

6. The terminal device according to claim 2, wherein the noise suppression structure comprises a plurality of holes running through the metal middle plate, and the plurality of holes are spaced regularly to form the hollow region.

7. The terminal device according to claim 2, wherein the noise suppression structure comprises a plurality of slits running through the metal middle plate, wherein each slit of the plurality of slits extends in a curved way, and the plurality of slits are regularly arranged to form the hollow region.

8. The terminal device according to claim 2, wherein the hollow region is a strip-shaped through-slot running through the first surface and the second surface of the metal middle plate.

9. The terminal device according to claim 6, wherein an axial cross-sectional contour of each hole of the plurality of holes is a regular polygon or a circular shape.

10. The terminal device according to claim 7, wherein:
the plurality of slits have consistent extension directions and are spaced; or
the plurality of slits have consistent extension directions and are arranged side by side, and two adjacent slits of the plurality of slits for a group of slits.

11. The terminal device according to claim 1, further comprising:
a second component mounted on the middle frame, wherein the second component is opposite to the first or second surface and forms a second cavity with the first or second surface, wherein the second cavity is spaced from the first cavity, and wherein the hollow region communicates with the second cavity.

12. The terminal device according to claim 11, further comprising:
a third component mounted on the middle frame, wherein the third component is opposite to the first or second surface and forms a third cavity with the first or second surface, wherein the third cavity is spaced from the first cavity and the second cavity, and wherein the hollow region of the noise suppression structure communicates with the third cavity.

13. The terminal device according to claim 1, further comprising:
a second component; and
a third component mounted on the middle frame,
wherein the second component and the third component are both opposite to the second surface,
wherein the second component and the third component form a second cavity and a third cavity with the second surface, respectively,
wherein the second cavity and the third cavity are spaced side by side, and a first noise suppression structure and a second noise suppression structure that have a same structure as the noise suppression structure are disposed at locations on the metal middle plate and opposite to the second cavity and the third cavity respectively, and
wherein the noise suppression structure is located between the first noise suppression structure and the second noise suppression structure.

14. The terminal device according to claim 1, wherein the noise suppression structure is located on the metal middle plate at a location corresponding to a middle region of the propagation path.

15. The terminal device according to claim 1, wherein the terminal device comprises a top end and a bottom end, the antenna is located at the top end, the backplane noise suppression structure is at a middle location of the metal backplane, and an overall length of the backplane noise suppression structure extends along a width direction of the metal backplane.

16. A terminal device, comprising:
a noise suppression structure that includes an antenna, a middle frame, and a display screen,
wherein the display screen comprises a metal middle plate, the antenna is disposed on an edge of the middle frame, the middle frame comprises a first surface and a second surface opposite to the first surface, the display screen is mounted on the middle frame, and a cavity is formed between the metal middle plate and the first surface;
wherein the noise suppression structure is disposed on the metal middle plate, the noise suppression structure comprises a hollow region running through the metal middle plate, and the hollow region communicates with the cavity;
wherein digital signal noise that uses the cavity as a transmission medium has a propagation path in a direction toward the antenna, the propagation path passes through the hollow region, and the hollow region is used to suppress the digital signal noise transmitted in the propagation path; and
wherein the display screen comprises a metal backplane opposite to the first surface, and the metal backplane is provided with a backplane noise suppression structure, wherein the backplane noise suppression structure comprises a second hollow region running through the metal backplane.

17. The terminal device according to claim 16, wherein the hollow region comprises a through-slot running through the first surface and the second surface, the through-slot comprises a strip-shaped first segment and two strip-shaped second segments, the first segment extends along a width direction of the metal middle plate, and the two second segments are respectively bent and extend from two opposite ends of the first segment toward a length direction of the metal middle plate.

18. The terminal device according to claim 17,
wherein the hollow region comprises a second through-slot running through the first surface and the second surface, wherein the second through-slot comprises a strip-shaped first segment and two strip-shaped second segments; and
wherein first segments of the through-slot and the second-through slot are spaced in parallel, and extension directions of second segments of the through-slot and the second-through slot are opposite.

19. The terminal device according to claim 16,
wherein the hollow region comprises two through-slot groups, each through-slot group of the two through-slot groups comprises a first through-slot and a second through-slot, and the first through-slot and the second through-slot are spaced;
wherein, for a given through-slot group of the two through-slot groups, the first through-slot comprises a strip-shaped first segment and two strip-shaped second segments, the first segment of the first through-slot extends along a width direction of the metal middle plate, and the two second segments of the first through-slot are respectively bent and extend from two opposite ends of the first segment toward a length direction of the metal middle plate;
wherein, for the given through-slot group of the two through-slot groups, the second through-slot has a same structure as but a different size from the first through-slot, the second through-slot comprises a first segment and two second segments, the second through-slot is located between the two second segments of the first through-slot and has a same symmetry axis as the first through-slot, and the second segment of the first through-slot has a same extension direction as the second segment of the second through-slot; and
wherein in the two through-slot groups, a first through-slot of one through-slot group is spaced from a first through-slot of the other through-slot group, and an extension direction of a second segment of one first through-slot is opposite to that of a second segment of the other first through-slot.

* * * * *

UNITED STATES PATENT AND TRADEMARK OFFICE
CERTIFICATE OF CORRECTION

| | | |
|---|---|---|
| PATENT NO. | : 12,394,890 B2 | Page 1 of 1 |
| APPLICATION NO. | : 18/010137 | |
| DATED | : August 19, 2025 | |
| INVENTOR(S) | : Gao et al. | |

It is certified that error appears in the above-identified patent and that said Letters Patent is hereby corrected as shown below:

On the Title Page

Page 2, Foreign Patent Documents, Citation 9: "IN 105591190 A 5/2016" should read -- CN 105591190 A 5/2016 --.

Signed and Sealed this
Thirtieth Day of September, 2025

John A. Squires
*Director of the United States Patent and Trademark Office*